(12) United States Patent
Sedlacek

(10) Patent No.: US 7,188,448 B2
(45) Date of Patent: Mar. 13, 2007

(54) PLANT SUPPORT CLIP, KIT AND METHOD THEREFOR

(75) Inventor: James E. Sedlacek, Reeds Spring, MO (US)

(73) Assignee: Woodstream Corporation, Lititz, PA (US)

( * ) Notice: Subject to any disclaimer, the term of this patent is extended or adjusted under 35 U.S.C. 154(b) by 0 days.

(21) Appl. No.: 10/444,675

(22) Filed: May 22, 2003

(65) Prior Publication Data
US 2004/0244286 A1  Dec. 9, 2004

(51) Int. Cl.
*A01G 17/06* (2006.01)

(52) U.S. Cl. .................... 47/47; 47/45; 47/46

(58) Field of Classification Search .......... 47/44, 47/45, 46, 47; 24/336, 339; 403/274, 282, 403/230, 233, 256; 248/200, 200.1, 230.7, 248/231.81, 231.71, 316.7, 316.8, 110–113; 211/187, 88.03, 85.23, 191, 192
See application file for complete search history.

(56) References Cited

U.S. PATENT DOCUMENTS 4,005,548 A * 2/1977 Nahon ..................... 47/45
4,655,000 A * 4/1987 Swick et al. ............. 47/44
5,253,768 A * 10/1993 Traversa et al. ......... 211/65
5,473,796 A * 12/1995 Fusillo .................. 24/30.5 R

FOREIGN PATENT DOCUMENTS

JP     406335326 A  * 12/1994
JP     02001299107 A * 10/2001

* cited by examiner

*Primary Examiner*—T. Nguyen
(74) *Attorney, Agent, or Firm*—Jacobson Holman PLLC

(57) ABSTRACT

A clip device is used in a kit, system and method for supporting plants during growth. The clip includes an elongated beam portion with clamp portions on each end. The clamp portions are made of a stiff, resilient material, and each includes a stationary jaw and a flexing jaw that define a bay sized to engage an elongated pole so that a pair of poles may be interconnected in spaced apart relation. The beam portion can be reinforced with flanges and/or gussets. The clamp portions may have cylindrical sidewalls and be in a C-shaped configuration. As a kit, a plurality of clip devices and a plurality of poles are provided in order to create a framework to support a plant. The method contemplates erecting poles at the vertices of a regular geometric polygon and releasably interconnecting them with these clip devices.

21 Claims, 3 Drawing Sheets

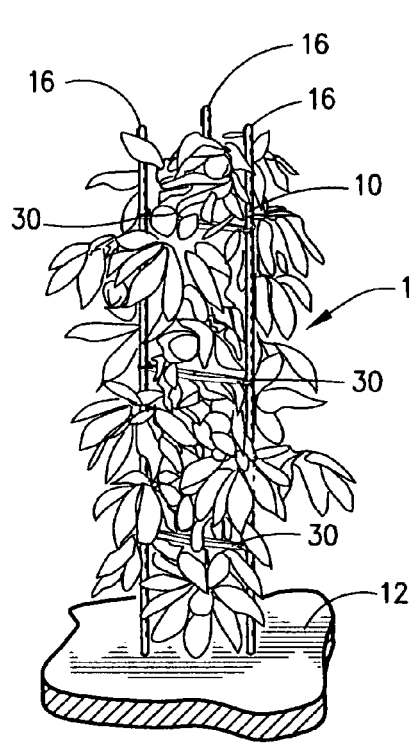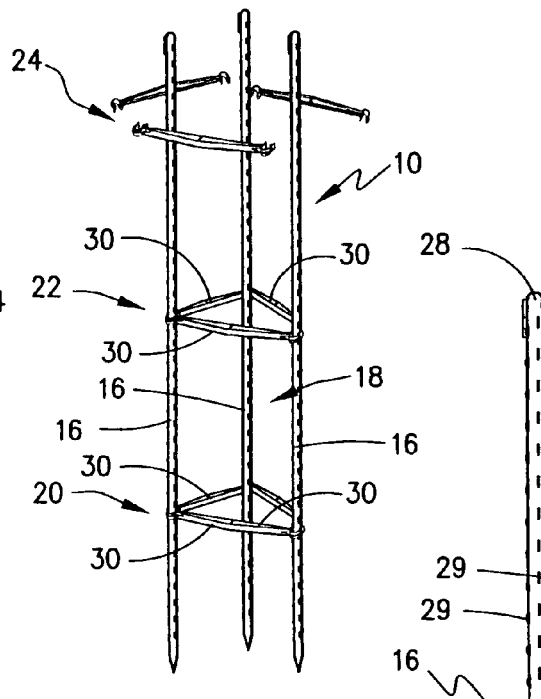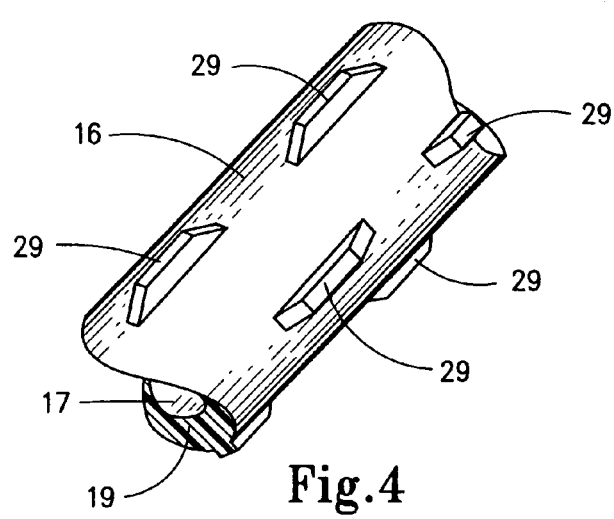
Fig.1
Fig.2
Fig.3 (PRIOR ART)
Fig.4 (PRIOR ART)

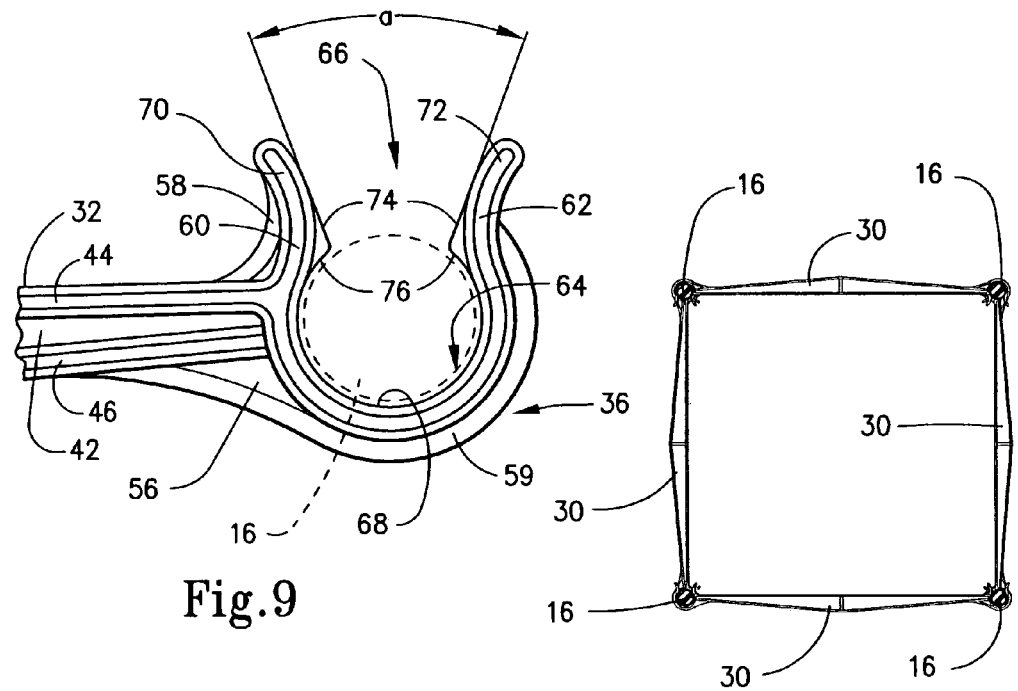
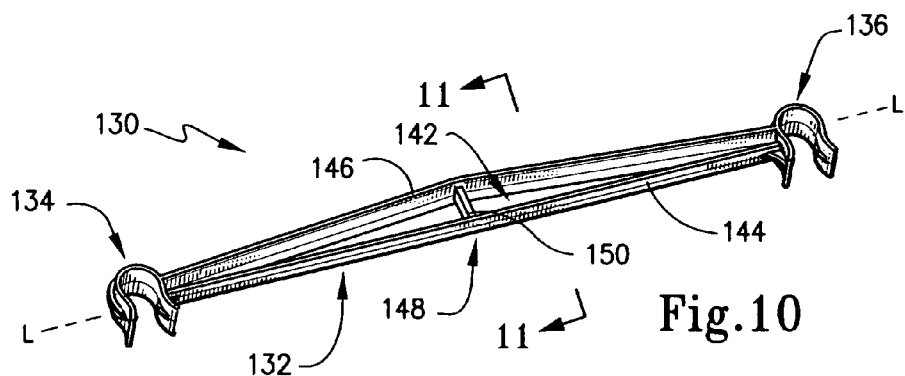
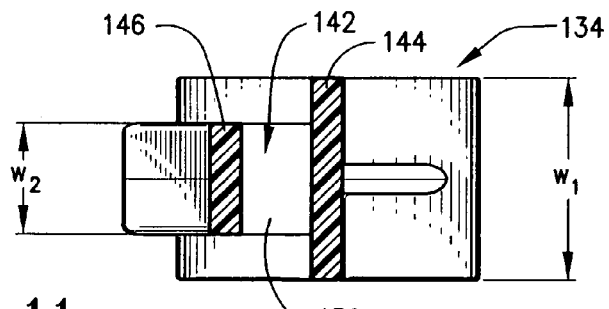
Fig. 9
Fig. 12
Fig. 10
Fig. 11

PLANT SUPPORT CLIP, KIT AND METHOD THEREFOR

FIELD OF THE INVENTION

The present invention broadly concerns horticultural activities. More particularly, the present invention concerns an apparatus to facilitate the growth of plants. This invention specifically concerns support structures for growing plants that support the stocks and branches thereof. Included within this invention, then, is a method and a kit for providing an apparatus for supporting a plant along with a clip device used in the kit and method.

BACKGROUND OF THE INVENTION

Since the early domestication of useful plants, humankind has sought improved ways to facilitate the growing, care and maintenance of such plants. This concern has reached both food producing plants as well as ornamental plants used predominantly for decorative purposes. It is known that many such plants benefit from the availability of a vertical framework approximate to the plant. For example, certain plants grow with generally upright stocks having laterally projecting stems or branches extending therefrom. The weight of the fruit or other growth structures of such plants can stress the stocks and branches. Such stress can result in damage to the plant including breakage of the stocks or branches resulting even in the death of the plant. This problem has increased due to the hybridization of certain plants to produce heavier fruits.

In addition, it is known that some climbing plants enjoy a support framework upon which to proliferate. Predominate among such plants are vines. Vines typically grow in an elongate manner and have tendrils that cling to structures for support. Decorative vines include, for example, many varieties of ivy's. Fruit producing vines include, for example, plants as diverse as grapevines and cucumbers which thrive when provided with a support framework.

In the past it has been known to provide various upright frameworks to support growing plants. In early times, it was known to provide a simple upright pole to which a plant may be tied. It has also been known to plant two different species adjacent one another such that one may provide support for the other. Here, for example, it is known to plant a climbing bean adjacent to a corn plant so that the climbing bean vine may intertwine around the corn stock and be supported vertical by the substantially more robust corn stock. Other support devices, such as trellises, fit within this category.

More advanced structures for the support of plants have been developed, yet are still relatively simple in their construction. It is known to support grapevines by using a series of fenceposts that are interconnected with one or more strands of wire upon which the grapevines may climb. Similarly, it is known to interconnect fence posts with a woven wire product for the vertical growing of garden plants. It is also known to provide various cage structures which surround an individual plant during growth. Cage structures, such as those known in the prior art, are generally shaped in a tube or inverted frustoconical configuration. Upright wire ribs are permanently joined to horizontal ribs to create a latticework to support a growing plant.

The existing plant supports have various problems associated with them. For example, existing wire cages are awkward to use and unwieldy to store. Typically, they must be placed around the plant at an early stage in its growth. Otherwise, it is difficult to place on the plant after it has reached a larger size. The storage of these devices also takes a substantial amount of room so it is not unusual for people to leave them in their gardens or other areas year-round. This can create, in some circumstances, an unsightly appearance. In addition, leaving the devices exposed to the elements can result in unwanted deterioration or degradation of the device.

The present invention addresses some of these problems by having a method and a kit utilizing elongated support rods that may be releasably interconnected by links in the form of clip devices which may releasably secure to the elongated pole at various levels. This allows the structure to be assembled even around a mature plant without significant risk of damage to the plant. Moreover, it can be disassembled and stored in a neat and compact manner. This structure also allows for great versatility in customizing a particular plant support, as desired.

SUMMARY OF THE INVENTION

It is an object of the present invention to provide a new and useful clip device that may be incorporated in a kit and method for supporting elongate poles so as to provide a support for a growing plant.

If is another object of the present invention to provide a simple and inexpensive clip device which may interconnect existing, off the shelf support poles for plants to create customized support structures.

A further object of the present invention is to provide a support structure for a plant which may be readily assembled and disassembled by the user.

Still a further object of the present invention is to provide a plant support which may be stored in a neat and compact manner.

To accomplish these objects, then, the present invention is directed to a kit and method for supporting a pole relative to a support surface utilizing a releasable clip device. Broadly, this clip device includes an elongated beam portion that extends generally along the longitudinal axis and has opposite first and second beam-ends. The clip device also includes a first clip portion supported on the first beam end and a second clamp portion supported on the second beam end. Each of these clamp portions is formed a stiff yet resilient material and includes a stationary jaw section approximate to the beam and a flexing jaw section in spaced relation to the stationary jaw section to form a jaw pair. The jaw pair thus defines a base sized to engage a portion of the elongated pole with an entryway thereto of reduced dimension relative to the bay.

In one exemplary embodiment, the beam portion of the clip device is formed by a web extending in a web plane between and a first flange and a second flange. In another embodiment, the beam portion is formed by the two flanges without the web, but a centrally located brace interconnects and reinforces the two flanges. The width of the second flange is shown to be less than the width of the first flange. Further, the beam has a beam height such as measured by the height of the web, that varies in magnitude such that the beam height at a central portion of the beam is greater than the beam height proximate to the first and second beam ends. That is, the first and second flanges converge toward one another from a central portion of the beam to reach the first and second beam ends. A central gusset is provided and is disposed in the central portion of the beam and extends between the first and second flanges the beam may also include a first end gusset that extends between the beam portion and a first clamp portion and a second gusset that extends between the beam portion and a second clamp portion. A reinforcement collar may be provided around at least part of the circumference of each clamp portion.

The clamp portions are shown to be C-shaped in configuration such that each jaw pair has free end portions that first converge towards one another and, in the disclosed embodiment, next diverge from one another. The angle of divergence may be at an angle between forty and fifty degrees. The C-shaped clamp portions may each be formed by cylindrical sidewall sections that have a central axis that is generally orthogonal to the longitudinal axis of the beam. Moreover, the first and second clamp portions may each have a clamp width that is substantially equal to the first flange width of the beam portion. Detent structures may also be associated with the first and second clamp portions, and the entryways to the bays may be located on a common side of the beam portion.

In the disclosed embodiments, the beam portion and the first and second clamp portions are formed as an integral one piece molded construction of plastic material. The first flange is disposed on a first edge of the web and a second flange is disposed on the second edge of the web opposite the first edge. The first and second flanges also extend generally perpendicular to the web plane.

The present invention also contemplates a kit adapted for use in supporting a plant relative to a support surface. This kit includes a plurality of poles each adapted to be erected in an upright manner relative to a support surface in spaced apart relation to one another. A plurality of clip devices, such as that described above, are provided and are adapted to interconnect adjacent ones of the poles. The plurality of poles in the kit may equal n and the plurality of clip devices may equal p×n wherein n is a positive integer greater than two and p is a positive integer greater than one. In the disclosed embodiments, the kit includes at least three poles and at least six clip devices.

The present invention also is directed to a method of supporting growing plants relative to a support surface this method comprises of certain steps, in any order. One step is erecting a support pole on the support surface generally at each vertex of a regular geometric polygon having n sides wherein n equals an integer greater than two. The support poles are interconnected to adjacent ones of the support poles at a first level by means of a substantially rigid link having a first end portion that engages the support pole and a second end portion that engages an adjacent support pole. Further, the method includes the step of releasably interconnecting each of the support poles to an adjacent support pole at a second level by means of a substantially rigid link having a first portion that engages the support pole and a second portion that engages the adjacent support pole. The first and second levels are spaced apart from one another so that the final structure will be a framework having a regular geometric prizmoidal configuration.

These and other objects of the present invention will become more readily appreciated and understood from a consideration of the following detailed description of the exemplary embodiments of the present invention when taken together with the accompanying drawings, in which:

BRIEF DESCRIPTION OF THE DRAWINGS

FIG. 1 is a perspective view showing an assembled plant support structure according to the present invention and showing a pole supported thereby;

FIG. 2 is a perspective view showing a constructed framework using the poles and clip devices of the present invention, kit and method with the framework of the plant support showing the linking of the poles at two levels and showing a linking third level in an exploded view;

FIG. 3 is a side view in elevation showing a support pole known in the prior art yet used with the kit and method of the present invention, by way of example;

FIG. 4 is a perspective view of a section of the support pole of FIG. 3;

FIG. 9 is an enlarged view of the clip device shown in FIG. 8 illustrating a representative clamp portion;

FIG. 10 is a perspective view a clip device according to a second exemplary embodiment of the present invention;

FIG. 11 is an enlarged cross-sectional view taken about lines 11—11 of FIG. 10; and FIG. 12 is a top plan view showing an assembled framework in alternative configuration using four elongated support poles.

DETAILED DESCRIPTION OF THE EXEMPLARY EMBODIMENTS

Figure 5:
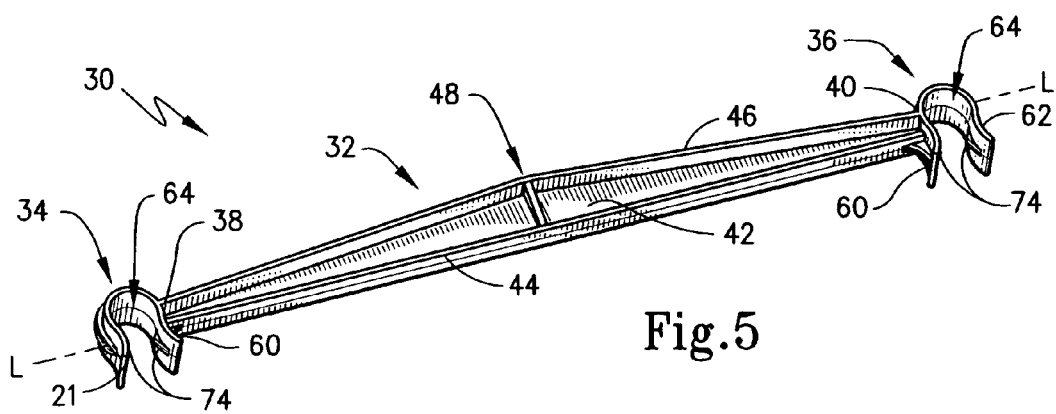
FIG. 5 is a perspective view a clip device according to the first exemplary embodiment of the present invention.

The present invention generally concerns support structures for growing plants as well as components used in such support structures. The present invention more specifically is directed to a clip device and to a kit incorporating a plurality of those clip devices with a plurality of pre-existing, off the shelf support poles of a type that are currently sold by the assignee of the present invention. Finally, the present invention broadly concerns a method of supporting plants utilizing a support structure as described herein.

By way of introduction, a support structure according to the present invention is illustrated in FIG. 1 and is used to create a framework 10 that is erected, in an upright manner on a support surface 12 in order to support a plant 14. The support surface 12 typically would be an earthen section such as in a garden, flowerbed, etc. As is shown in FIG. 1, the illustrated framework 10 includes a plurality of upright support poles 16 that are generally rigidly interconnected to one another by means of links defined by clip devices 30. It may be seen, further, that poles 16 are equidistantly spaced apart from one another and, in cross-section, are located at the vertices of a regular polygon which, in this illustration, is a triangle. However, as discussed more thoroughly below, the present invention is directed to a support structure wherein the cross-section is any generally regular polygon having n sides wherein n is a positive integer greater than 2.

Framework 10 is illustrated in greater detail in FIG. 2. Here, it may be seen that the three support poles 16 are joined by a plurality of clip devices 30 at a first level 20 and at a second level 22 that are spaced apart from one another. An additional set of three clip devices 30 are shown for connection at a third level 24 that is also spaced apart and parallel to clip devices 30 at levels 20 and 22. When joined, framework 10 defines an interior 18 within which a growing plant may be placed or grown. It should be further appreciated that clip devices 30 may be releasably secured to support poles 16 so that framework 10 may be assembled for use or readily disassembled for storage in a neat and compact manner.

A prior art support pole used in framework 10 is illustrated in FIGS. 3 and 4. This support pole 16 has a lower end 26 that is pointed so that it may be inserted into the support surface, such as the ground. Support pole 16 has an upper end 28 such that the distance between end 26 and 28 defines the length of support pole 16. Support pole 16, as illustrated better in FIG. 4, includes a plurality of spurs 29 which provide grips for clinging vines, for example, but also interact with the clip device 30 to help prevent sliding movement of a secured clip device 30 longitudinally of a respective support pole 16.

Support poles 16 are available from the assignee of the present invention, California Plastic Products located in Tustin, Calif. These stakes are available in lengths ranging from 2 feet through 8 feet and may be of varying diameters. Each stake has a steel core 17 for strength with the steel core being plastic coated by a layer 19 for watertight protection.

Heretofore, support poles 16 have been marketed as a stake which may be erected vertically and to which a plant may be tethered. According to the present invention, however, the poles 16 may be interconnected by new and useful clip devices. A first exemplary embodiment of a clip device 30 that is best depicted in FIGS. 5–9. In these figures, it may be seen that clip device 30 includes an elongated beam portion 32 and first and second clamp portions 34 and 36. Clamp portion 34 is located on a first beam end 38 while second clamp portion 36 is located on a second beam end 40. In this embodiment, it should be understood that clip device 30 is formed as an integral, one piece molding of a plastic material, such as polypropylene and the like.

Figure 6:
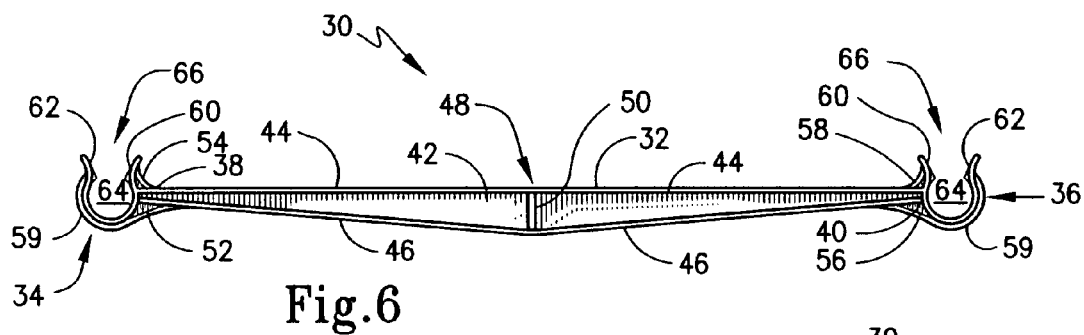
FIG. 6 is a top plan view showing the clip device of FIG. 5.
Figure 7:
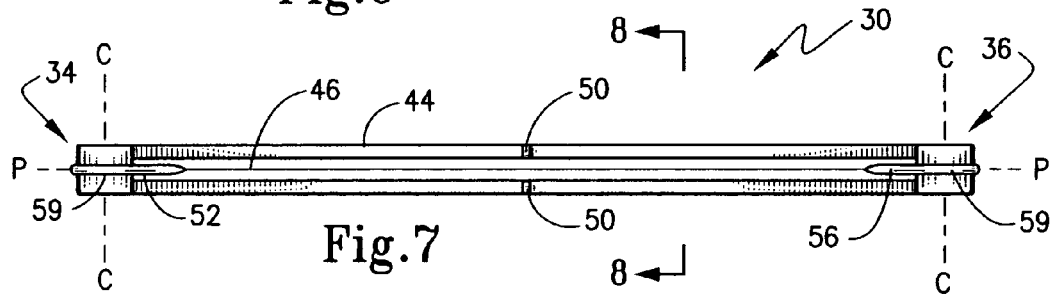
FIG. 7 is a side view in elevation showing the clip device of FIGS. 5 and 6.
Figure 8:
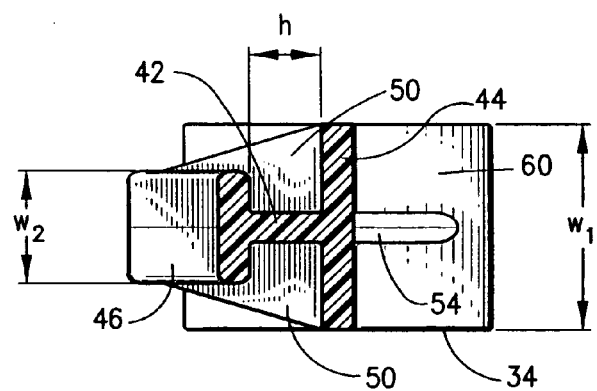
FIG. 8 is an enlarged cross-sectional view taken about lines 8—8 of FIG. 7.

With continued reference to FIGS. 5–7, and with reference to the detail shown in FIG. 8, it may be seen that beam portion 32 extends along a longitudinal axis "L" and is formed by a web 42, a first flange 44 and a second flange 46 with first and second flanges 44 and 46 being located on opposite edges of web 42. A pair of central gussets 50 interconnect first flange 44 and second flange 46 to increase the strength and rigidity of beam portion 32.

Web 42 extends in a web plane "P" with the first flange 44 and the second flange 46 extending generally perpendicularly to web-plane "P". First flange 44 has a first flange width "$w_1$" second flange 46 has a second flange width "$w_2$". As is illustrated in FIG. 8, "$w_1$">"$w_2$". Moreover, as can be best seen in FIGS. 5 and 6, the height of beam portion 32, as defined by the height of "h" of web 42 (FIG. 8) varies from a central portion 48 to first and second beam ends 38 and 40, with the beam height at a central portion is greater than the beam height proximate to the first and second beam ends. In other words, first and second flanges 44 and 46 converge toward one another from central portion 48 toward each end 38 and 40.

As noted above, beam portion 32 supports clamp portions 34 and 36 at opposite ends thereof. Clamp portions 34 and 36 are similar in construction and are each C-shaped in configuration. First end gussets 52 and 54 extend generally in web-plane "P" and extend between beam portion 32 and first clamp portion 34. A pair of second end gussets 56 and 58 are also located in web-plane "P" and interconnect second clamp portion 36 to beam portion 32. A reinforcement collar 59 extends around a portion of the circumference of each clamp portion 34 and 36.

Due to the molding out of plastic material, first and second clamp portions 34 and 36 are formed of a stiff yet resilient material. As is illustrated, each of these clamp portions includes a stationary jaw section 60 and a flexing jaw section 62 that together form a jaw pair that define a bay 64 that is sized to engage a portion of the elongated pole. Bay 64 has an entryway 66 thereto. This engagement allows the user to "snap-fit" each clamp portion onto an elongated pole so that the size of the entryway should be smaller than the dimension of the pole and the dimension of the bay slightly larger than the dimension of the pole.

The structure of a representative clamp portion, in the form of second clamp portion 36 is illustrated in FIG. 9. Here, it may be seen that each jaw pair formed by a stationary jaw section 60 and a flexing jaw section 62 has free end portions 70 and 72 that first converge toward one another and then diverge from one another to form entryway 66. This angle of divergence "a" is illustrated as an acute angle which may, for example, be in the range of forty to fifty degrees but preferably is approximately 45 degrees. Each of the first and second clamp portions has a cylindrical sidewall section 68 that, as illustrated in FIG. 7, has a central axis "C" that is oriented generally orthogonal to the web plane "P" and thus to the longitudinal axis "L". Moreover, as is shown in FIG. 8, it may be seen that each of first and second clamp portions 34 and 36 have a clamp width that is substantially equal to the first flange width, that is "$w_1$".

With reference again to FIG. 9, it may be seen that the diameter of bay 64 is chosen to be slightly larger than the diameter of the support pole 16 so that each of clamp portions 34 and 36 may resiliently clamp onto a respective pole 16. Moreover, entryway 66 is slightly smaller than the diameter of pole 16 so that the clamp devices may snap fit over a pole during assembly. To further facilitate engagement of the clamp portions 34 and 36 with a rod 16, each of the clamp portions is provided with a detent structure 74. Each of these detent structures 74 is formed by a small triangularly shaped ear that has an inner edge 76 formed along the same radius of curvature as sidewall 68. Moreover, with reference again to FIGS. 5–7 it may be seen that each bay 64 and, specifically, each entryway 66 to bays 64 are located on a common side of beam portion 32.

A second exemplary embodiment of the link or clip device according to the present invention is illustrated in FIGS. 10–11. In these figures, it may be seen that clip device 130 is formed as an elongated beam portion 132 that supports first and second clamp portions 134 and 136 at opposite ends thereof. Clip device 130 is again formed as an integral one piece molding of plastic material and has a longitudinal axis "L". The structure of each clamp portions 134 and 136 are substantially identical to that described above, so that structure is not again repeated.

The structure of clip device 130 departs from the first exemplary embodiment in the construction of beam portion 132. Here, it may be seen that beam portion 132 is formed by a first flange 144 and a second flange 146 that are spaced apart from one another a greatest distance at a central portion 148. Flanges 144 and 146 again converge towards one another as they approach the opposite ends of beam portion 132. However, in this embodiment, an interconnecting web, such as web 42, is eliminated. Thus, substantially all of the region 142 between flanges 144 and 146 is open. However, as is again shown in these Figures, flanges 144 and 146 are supported relative to one another by means of a central brace 150 that is centrally located and has a height that is the same as second flange 146, that is, "$w_2$" and that extends transversely of the longitudinal axis "L". First flange 144 has a larger width, "$w_1$%". It may be seen in reference to FIG. 11 that each of the clamp portions, such as clamp portion 134, has a height that is substantially the same as first flange portion 144. As noted, however, in all of the respects, the construction of clip device 130 is substantially the same as clip device 30 so that it includes the features, such as the gussets and reinforcement collars identified above.

From the foregoing, it should be understood that the present invention also contemplates a kit for use in supporting a plant relative to a support surface. Such kit includes a plurality of poles 16 that are each adapted to be erected in an upright manner relative to a support surface in spaced apart relation to one another and a plurality of clip devices adapted to interconnect adjacent ones of the poles. Each clip device may then be constructed as illustrated in FIGS. 5–9 or in FIGS. 10–11.

Broadly, however, the clip devices in the kit should include and elongated beam portion extending generally along the longitudinal axis and having opposite first and second beam-ends. A first clamp portion is supported on the first beam end and is sized and adapted to grip one of a pair of clamps of the kit. A second clamp portion supported on a second beam end is sized and adapted to grip another of the pair of poles with each of the first and second clamp portions being formed of a stiff yet resilient material. Each clamp portion includes a stationary jaw section proximate to the beam portion and a flexing jaw section in spaced relation to the stationary jaw section to form a jaw pair that defines a bay sized to engage a portion of the elongated rod with an entryway thereto of reduced dimension relative to the bay.

While it should be understood that the present invention contemplates the use of a plurality of clip devices 30 or 130, it is possible to construct them somewhat differently than as exactly illustrated in Figures. To this end, for example, it would not be necessary in the kit for the clip devices to have bays opening on a common side of the beam portion. Other changes could be made to the structure without departing from the scope of the present invention.

In any event, however, the kit should include at least three of the poles and at least six clip devices. In the kit contemplated by the present invention, the plurality of poles in the kit equals n and the plurality of clip devices equals p×n where n is positive integer greater than 2 and p is a positive integer greater than 1. In other words, the number of clip devices always equals an integral multiple of at least twice the number of poles and the kit includes at least three poles, depending on the geometry selected.

Furthermore, it should be understood that the present invention contemplates a method of supporting growing plants relative to a support surface. This method includes a plurality of steps, which may be implemented in any order. Broadly, the method includes the step of erecting a support pole on the support surface generally at each vertex at a regular geometric polygon having n sides wherein n equals an integer greater than 2. Each support pole is releasably interconnected to an adjacent support pole at a first level by means of a substantially rigid link, such as but not limited to a clip device 30 or 130, which has a first end portion that engages the support pole and a second end portion that engages an adjacent support pole. The method also includes the step of releasably interconnecting each support pole to an adjacent support pole at a second level that is spaced apart from the first level. This interconnection is again accomplished by means of a substantially rigid link, such as but not limited to a clip device 30 or 130, wherein the link has a first portion that engages one support pole and a second portion that engages an adjacent support pole.

It should be understood, that, according to the present invention, at least two levels of linking between the adjacent support poles is desired although a greater number of linking levels could be provided, depending upon the selected length of pole 16. As is illustrated in FIG. 2, for example, three levels of links are employed, mainly, levels 20, 22 and 24.

Moreover, while this description depicts a framework 10 in the form of a triangular prism, other geometries are contemplated. In the first embodiment, the regular geometric polygon is a triangle having three sides. However, as is illustrated in FIG. 12, the polygon may be a square with there being four support poles and four support poles 16 and four clip devices 30 at each level. It should be understood that the cross-section can be any generally regular polygon of any order higher than four sides.

Furthermore, it is possible to erect the framework according to the present invention by first inserting the pole 16 into the support surface and thereafter interconnecting the poles with the link devices or, alternatively, interconnecting the poles prior to insertion into the support surface. Therefore, according to the present method, it is not necessary that the steps be undertaken in any specific sequence. Finally, it should be understood that the method may not be limited to forming a polygonal array of poles and clips. Indeed, it would be possible to arrange the poles in a fence-like arrangement and interconnect adjacent pole with the clips described herein.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A clip device adapted to interconnect a pair of elongate poles in spaced apart relation, comprising:
   (A) an elongated beam portion extending generally linearly along a longitudinal axis and having opposite first and second beam ends arranged on said axis and separated from one another by a length of said beam portion; and
   (B) a first clamp portion supported on the first beam end and a second clamp portion supported on the second beam end, each of said first and second clamp portions formed of a stiff yet resilient material and including:
      (1) a stationary jaw section proximate to said beam and
      (2) a flexing jaw section in spaced relation to said stationary jaw section to form a jaw pair such that each of said first and second clamp portions has a generally cylindrical sidewall, said jaw pair including a detent structure associated therewith and having an inner edge formed along substantially a same radius of curvature as said sidewall.

2. The clip device according to claim 1 wherein each jaw pair has free end portions that first converge toward one another and then diverge from on another.

3. The clip device according to claim 2 wherein the free end portions of said jaw pairs diverge at an angle of between forty and fifty degrees.

4. The clip device according to claim 1 wherein said beam portion, said first clamp portion and said second clamp portion are formed as an integral one-piece molded construction.

5. A clip device adapted to interconnect a pair of elongate poles in spaced apart relation, comprising:

(A) an elongated beam portion extending generally along a longitudinal axis and having opposite first and second beam ends;

(B) a first clamp portion supported on the first beam end and a second clamp portion supported on the second beam end, each of said first and second clamp portions constructed of a stiff yet resilient material and including:

(1) a stationary jaw section proximate to said beam and (2) a flexing jaw section in spaced relation to said stationary jaw section to form a jaw pair defining a bay that has a generally cylindrical sidewall with a central axis that is generally orthogonal to the longitudinal axis and that is sized to engage a portion of the elongated pole with an entryway thereto having an opening of reduced dimension relative to the bay, said entryway opening facing generally perpendicular to said longitudinal axis; and each jaw pair including a detent structure having an inner edge formed on said bay to have a radius of curvature substantially the same as said generally cylindrical sidewall.

6. The clip device according to claim 5 wherein said beam portion includes a web extending in a web plane and first and second flanges spaced apart from one another, said first and second flanges extending transversely of said web plane.

7. The clip device according to claim 6 wherein said first flange is disposed on a first edge of said web and said second flange is disposed on a second edge of said web opposite said first edge, said first and second flanges extending generally perpendicularly to the web plane.

8. The clip device according to claim 6 including a central brace extending between said first and second flanges.

9. The clip device according to claim 5 wherein said elongated beam portion extends generally linearly along a longitudinal axis.

10. The clip device device according to claim 5 wherein each jaw pair has free end portions that first converge toward one another and then diverge from one another, said detent structure located between said converging and diverging portions.

11. A clip device adapted to interconnect a pair of elongate poles in spaced apart relation, comprising:

(A) an elongated beam portion extending generally along a longitudinal axis and having opposite first and second beam ends, said beam portion including a first flange that has a first flange width and a second flange that has a second flange width wherein the second flange width is less than the first flange width; and (B) a first clamp portion supported on the first beam end and a second clamp portion supported on the second beam end, each of said first and second clamp portions formed of a stiff yet resilient material and including:

(1) a stationary jaw section proximate to said beam and (2) a flexing jaw section in spaced relation to said stationary jaw section to form a jaw pair defining a bay sized to engage a portion of the elongated pole with an entryway thereto of reduced dimension relative to the bay.

12. A clip device adapted to interconnect a pair of elongate poles in spaced apart relation, comprising:

(A) an elongated beam portion extending generally along a longitudinal axis and having opposite first and second beam ends; and (B) a first clamp portion supported on the first beam end and a second clamp portion supported on the second beam end, each of said first and second clamp portions formed of a stiff yet resilient material and including:

(1) a stationary jaw section proximate to said beam and (2) a flexing jaw section in spaced relation to said stationary jaw section to form a jaw pair that has a C-shaped configuration to define a bay sized to engage a portion of the elongated pole with an entryway thereto of reduced dimension relative to the bay, each of said jaw pairs including a reinforcement collar extending around a portion of the C-shaped configuration.

13. A clip device adapted to interconnect a pair of elongate poles in spaced apart relation, comprising:

(A) an elongated beam portion extending generally along a longitudinal axis and having opposite first and second beam ends, said beam portion including a first flange that has a first flange width and a second flange that has a second flange width, said second flange width being less than said first flange width; and (B) a first clamp portion supported on the first beam end and a second clamp portion supported on the second beam end, each of said first and second clamp portions being formed of a stiff yet resilient material and having a clamp width that is substantially equal to the first flange width, and including:

(1) a stationary jaw section proximate to said beam and (2) a flexing jaw section in spaced relation to said stationary jaw section to form a jaw pair.

14. A kit adapted for use in supporting a plant relative to a support surface, comprising:

a plurality of poles, each said pole adapted to be erected in an upright manner relative to a support surface in spaced-apart relation to one another; and a plurality of clip devices adapted to interconnect adjacent ones of said poles, each said clip device including, an elongated beam portion extending generally along a longitudinal axis and having opposite first and second beam ends to maintain said plurality of poles in said spaced-apart relation when connected thereto; and a first clamp portion supported on the first beam end and sized and adapted to grip one of a pair of said poles and a second clamp portion supported on the second beam end and sized and adapted to grip another of said pair of said poles;

each of said first and second clamp portions formed of a stiff yet resilient material and including a stationary jaw section proximate to said beam and a flexing jaw section in spaced relation to said stationary jaw section to form a jaw pair defining a bay sized to engage a portion of the elongated pole with an entryway thereto of reduced dimension relative to the bay, said jaw pair including a reinforcement collar extending around a portion of said bay.

15. The kit according to claim 14 wherein said beam portion, said first clamp portion and said second clamp portion are an integral one-piece construction of molded plastic material.

16. The kit according to claim 14 wherein said beam portion includes a first flange having a first flange width and a second flange having a second flange width, a width of said clamp portions being substantially equal to said first flange width.

17. The kit according to claim 14 wherein said beam portion includes a first flange having a first flange width and a second flange having a second flange width, said second flange width being less than said first flange width.

18. The kit according to claim 14 wherein said poles are generally cylindrical and said bay has a generally cylindrical sidewall.

19. A clip device adapted to interconnect a pair of elongate poles in spaced apart relation, comprising:
- an elongated beam portion extending generally linearly along a longitudinal axis and having opposite first and second beam ends arranged on said axis; and
- a first clamp portion supported on the first beam end and a second clamp portion supported on the second beam end, each of said first and second clamp portions including a stationary jaw section proximate to said beam and a flexing jaw section in spaced relation to said stationary jaw section to form a jaw pair, each of said first and second clamp portions having a generally cylindrical sidewall with a central axis that is generally orthogonal to the longitudinal axis;
- said beam portion and said first and second clamp portions being an integral one-piece construction of molded plastic material; and
- a reinforcement collar extending around a portion of said sidewall.

20. The clip device according to claim 19 wherein said plastic material is polypropylene.

21. The clip device according to claim 19 wherein said elongate beam includes opposed flanges joined by central gussets for rigidity and strength.

\* \* \* \* \*